United States Patent [19]

O'Rourke et al.

[11] Patent Number: 5,953,118
[45] Date of Patent: Sep. 14, 1999

[54] MULTIPLEXED SPECTROPHOTOMETRY SYSTEM

[75] Inventors: Patrick E. O'Rourke, Martinez, Ga.; William R. Toole, Jr., Aiken, S.C.

[73] Assignee: Equitech Int'l Corporation, Aiken, S.C.

[21] Appl. No.: 09/042,432

[22] Filed: Mar. 13, 1998

Related U.S. Application Data

[63] Continuation-in-part of application No. 08/943,165, Oct. 3, 1997
[60] Provisional application No. 60/036,590, Mar. 14, 1997, and provisional application No. 60/027,813, Oct. 4, 1996.

[51] Int. Cl.[6] .................................................. G01J 3/28
[52] U.S. Cl. ............................................................ 356/326
[58] Field of Search .................................... 356/326, 328, 356/325, 330–334, 300, 418, 445–448, 319; 359/115–140

[56] References Cited

U.S. PATENT DOCUMENTS

| | | |
|---|---|---|
| 4,647,154 | 3/1987 | Birnbach et al. . |
| 4,755,054 | 7/1988 | Ferree . |
| 5,071,250 | 12/1991 | McGee . |
| 5,131,746 | 7/1992 | O'Rourke et al. . |
| 5,168,367 | 12/1992 | O'Rourke et al. . |
| 5,298,428 | 3/1994 | O'Rourke et al. . |
| 5,402,508 | 3/1995 | O'Rourke et al. . |
| 5,528,363 | 6/1996 | Fachinger et al. . |
| 5,742,389 | 4/1998 | Zavislan et al. . |
| 5,774,610 | 6/1998 | O'Rourke et al. . |

OTHER PUBLICATIONS

Batchelder "Multichannel . . . Detector" ESN–European Spectroscopy News 90, 1988 pp. 28,32,34.

*Primary Examiner*—K. P. Hantis
*Attorney, Agent, or Firm*—Maria Reichmanis

[57] ABSTRACT

A multiplexed spectrophotometry apparatus, including a rotary multiplexer fitted with a plurality of fiber terminals, a spectrophotometer mounted to the multiplexer and rotatable therewith, and a programmable on-board computer. The spectrophotometer includes precision optics, a charge coupled device (CCD) detector, electronics, and a cooling system, all contained in a compact, streamlined housing that is shaped to promote the radiation of heat from the spectrophotometer and thereby prevent excessive heating during operation of the apparatus. The spectrophotometer is mounted directly to the multiplexer so that any selected terminal can readily be brought into precise, reproducible alignment with the spectrophotometer input. All components of the apparatus are contained in a compact housing adapted for either rack-mounted or bench-top use.

20 Claims, 4 Drawing Sheets

MULTIPLEXED SPECTROPHOTOMETRY SYSTEM

The instant application is a continuation-in-part of application Ser. No. 08/943,165 filed Oct. 3, 1997, and claims benefit of U.S. provisional application Ser. No. 60,036,590 filed Mar. 14, 1998 and Ser. No. 60/027,813 filed Oct. 4, 1996.

BACKGROUND OF THE INVENTION

1. Field of the Invention

The present invention relates to spectrophotometry. In particular, the present invention relates to a rugged, compact spectrophotometry system that includes a spectrophotometer, a multiplexer, and an on-board computer.

2. Discussion of Background

Spectrophotometric techniques based on light emission, absorption or scattering processes are widely used for qualitative and quantitative analyses. A typical spectrophotometry system includes several basic components: a light source, a collimator, a light-dispersing mechanism such as a prism or diffraction grating, and a detector. In absorption spectroscopy, light from the source passes through a sample and is focused onto the detector, which produces an output signal proportional to the absorbance of the sample. The absorbance or absorption spectrum of the test sample is compared with the spectra of other samples containing known concentrations of various substances in order to determine the quantitative amounts of these substances present in the test sample.

Recent developments in fiber optics, coupled with the availability of multichannel array-type spectrometers and multiplexing technology, have generated renewed interest in the use of remote spectroscopic techniques for in-line monitoring and process control, environmental monitoring, and medical applications. Signal transmission via optical fibers allows for the placement of sensitive equipment in central locations, making remote sensing a particularly attractive choice for monitoring processes that take place in harsh industrial process environments. In the environmental field, remote sensing techniques are used for in situ measurements of fluids in wells, boreholes, storage and process tanks, etc. Applications include monitoring groundwater flow, studying the migration of subsurface contaminants, evaluating the progress of remediation operations, and detecting toxic or explosive substances.

Optical analysis techniques also improve the quality of the data. Data obtained from a sample are not always truly representative of the source of that sample, since the mere act of taking the sample can alter its properties; frequently, removing a sample can perturb the source as well. Optical techniques can frequently be implemented without the need to take samples for laboratory analysis elsewhere; therefore, data from optical analyses can be more reliable than data obtained using other analytical techniques.

Multiplexing—using a single instrument to measure and analyze signals from a plurality of sources—furthers the efficient use of complex and expensive instrumentation. Optical fibers connect a plurality of probes to a multiplexer, which in turn is connected to a single measuring instrument such as a spectrophotometer. Measurements are made by switching between probes, so that each probe in turn is connected to the instrument. The principal advantage of multiplexing is that a single light source and a single detector can be used for measuring the outputs of many probes, even probes at widely-separated locations.

In U.S. Pat. No. 5,131,746, O'Rourke, et al. describe an on-line process control monitoring system that makes use of a plurality of fiber optic probes, each probe at a different process location. The system includes a light source, optical fibers for carrying light to and from the probes, a multiplexer for switching light from the source from one probe to a next in series, a spectrophotometer, and a computer programmed to analyze the spectra. Standard and reference cells may be included for data validation and error checking. Alternatively, self-referencing measurements utilizing the method described in U.S. Pat. No. 5,298,428 can be implemented. Here, two successive absorption spectra of a sample containing a photoreactive substance are compared to determine the concentration of the substance. For non-photoreactive substances, a photoreactive dye can be added to the sample to make a mixture with photoreactive properties unique to the mixture. The disclosures of U.S. Pat. Nos. 5,131,746 and 5,298,428 are incorporated herein by reference.

A wide variety of fiber optic probes are available for use with spectrophotometry systems. By way of example, U.S. Pat. No. 5,168,367 describes a variable path length probe for spectrophotometric measurements of fluids in situ. For Raman-type measurements of scattered light, probes designed for improved light coupling efficiency such as the probe described in U.S. Pat. No. 5,402,508, the disclosure of which is incorporated herein by reference, are useful. The probe includes a housing with a transparent window across its tip for protecting the transmitting and receiving fibers. The endfaces of the fibers are slanted, resulting in improved light coupling efficiency between the transmitting and receiving fibers. Other suitable probes include those disclosed in the following commonly-assigned, co-pending applications, the disclosures of which are incorporated herein by reference: Ser. No. 08/676,432, filed Jul. 8, 1996 (Fiber Optic Probe); Ser. No. 09/031,527, filed Feb. 27, 1998 (Retro-Reflection Probe With Collimating Lens Assembly); Ser. No. 09/032,073, filed Feb. 27, 1998 (Fiber Optic Probe for Attenuated Total Internal Reflection Spectrophotometry); Ser. No. 09/031,521, filed Feb. 27, 1998 (Fiber Optic Raman Probe and Coupler Assembly); Ser. No. 60/076,140, filed Feb. 27, 1998 (Fiber Optic Probe System for Spectrophotometric Analyses).

Despite the advantages of both spectrophotometry and multiplexing technology for sample analysis and process control, widespread use of these technologies outside the laboratory has been limited by the twin problems of cost-effectiveness and reliability. A wide variety of spectrophotometers are available; however, most of these instruments are relatively complex and delicate, expensive, and require skilled operators to ensure the accuracy and reliability of the data. Without adequate cooling systems, temperature changes during operation of many spectrophotometers may lead to warping, which decreases the reliability of the measurements. Small, light-weight units are particularly susceptible to heating during extended use, which renders measurements made with these units inherently unreliable.

Optical multiplexers have a plurality of closely-spaced fiber terminals or optical probes arranged in linear or rectangular arrays. To make a series of measurements using such a device, an optical fiber leading to the detector is precisely aligned with each selected terminal (or probe) in turn by a stepper motor or similar device. Alternatively, the array itself can be moved so as to align different terminals with the detector. To ensure reproducible, dependable measurements, the individual fiber terminals in the array need to be very precisely positioned with respect to each other, requiring each position in the array to be machined to extremely close tolerances. Manufacturing these types of multiplexers is a difficult, labor-intensive and time-consuming process which requires costly precision machining equipment. Even though a number of multiplexed spectrophotometry systems are available, the cost of a rugged, reliable system that is capable of providing useful data is simply too high for many potential users.

There is a need for a simple, rugged multiplexed spectrophotometry system that can be readily adapted for laboratory, industrial process and field use, and that can be manufactured and assembled without costly, high-precision equipment. Such a system would include a compact spectrophotometer and a multiplexer with a plurality of precisely-alignable connectors for optical probes.

SUMMARY OF THE INVENTION

According to its major aspects and broadly stated, the present invention is a high-resolution, high-sensitivity multiplexed spectrophotometry apparatus that includes an optical multiplexer with a plurality of fiber terminals, a spectrophotometer operatively connected to the multiplexer, a programmable on-board computer with chemometric software, and, in a preferred embodiment of the invention, at least one light source. All components of the apparatus are contained in a compact housing, preferably a housing suitable for either rack-mounted or bench-top use. The apparatus may be used for absorbance, reflectance, fluorescence, and Raman spectrophotometry.

A major feature of the present invention is the spectrophotometer, which includes precision holographic optics, a charge coupled device (CCD) detector, electronics, and an integral cooling system. These components are fitted into a compact, streamlined housing that serves as both the spectrophotometer housing and the detector housing. The spectrophotometer is mounted to the multiplexer so that any selected optical terminal can readily be brought into precise, reproducible alignment with the spectrophotometer input. The performance characteristics of the spectrophotometer depend on a number of factors, including but not limited to the dimensions of the housing, the properties of the detector, and the properties of the optics. By way of example, a spectrophotometer according to the invention may provide wavelength coverage in the range of approximately 200–800 nm with a resolution of at least approximately 0.7 nm and a dynamic range of at least 15,000.

An important feature of the present invention is the optical multiplexer. Although other multiplexers may also be useful for the practice of the invention, the multiplexer is preferably a rotary multiplexer such as that described in our co-pending, commonly-assigned application Ser. No. 08/943,165, filed Oct. 3, 1997 (Rotary Fiber Optic Multiplexer), the disclosure of which is incorporated herein by reference. The multiplexer includes a stationary base plate and a rotary plate, a rotatable coupler connecting the plates, and a stepper motor assembly for rotating one of the plates with respect to the other plate. The base plate has a plurality of throughholes arranged in a substantially circular array about a central axis, at least some of the throughholes being fitted with connectors for securing optical fiber assemblies, terminals, or probes thereto. The rotary plate has at least one throughhole positioned so that, when the plate is rotated by the stepper motor assembly, the throughhole can be precisely and reproducibly aligned with any selected throughhole of the base plate. This arrangement allows for stable, accurate measurements of a plurality of optical channels with a repeatability of no more than approximately 5 microns (that is, reproducible positioning to within 5 microns or less), attainable switching times no greater than approximately 1 second/channel, and high total optical throughput.

Another important feature of the present invention is the placement of the spectrophotometer. As noted above, the spectrophotometer is mounted directly to the rotary plate of the multiplexer, positioned so that its optical input is in alignment with a throughhole of the rotary plate. Because the spectrophotometer is fixed to the rotary plate and therefore rotates with the plate, it can readily be aligned with any selected throughhole of the base plate. Thus, the spectrophotometer can quickly and easily be positioned in precise, reproducible optical alignment with any optical device (fiber optic assembly, fiber optic terminal, probe, etc.) that is fitted to or connected to the selected throughhole.

Another feature of the present invention is the integral cooling system. The spectrophotometer housing not only serves as a heat sink for the spectrophotometer components contained therein, but furthermore is shaped to promote radiation of heat generated during operation of the apparatus. The rotary plate of the multiplexer (upon which the spectrophotometer is mounted) provides an additional heat sink, as does the multiplexer base plate. These multiple heat sinks reduce the overall cooling requirements for the apparatus and also minimize heat-related warping of sensitive components, thereby resulting in increased accuracy and reliability of measurements made with the apparatus. If additional cooling capability is desired, a cooling fan can be added.

Still another feature of the present invention is the optical system. The components of the optical system—the holographic grating, the window, and the CCD detector—are configured and aligned so that essentially all detection takes place within the housing, which allows all of these components to be contained within a single housing rather than separate spectrophotometer and detector housings. This feature also permits the spectrophotometer housing to act as a heat sink for the detector.

Yet another feature of the present invention is the housing which contains the components of the apparatus. The housing includes a monitor, a floppy disk drive or other device for receiving storage media (CD-ROM drive, PCMCIA slot, DAT drive, tape drive, etc.), a recess or drawer for storing a computer keyboard or other user-operable input device, and user-operable controls. A door permits a user to access the interior of the housing. In a preferred embodiment of the invention, the door carries a strain-relieving mount for holding fiber optic cables that are connected between the multiplexer and a series of remotely-located probes.

Other features and advantages of the present invention will be apparent to those skilled in the art from a careful reading of the Detailed Description of a Preferred Embodiment presented below and accompanied by the drawings.

DETAILED DESCRIPTION OF A PREFERRED EMBODIMENT

Figure 1:
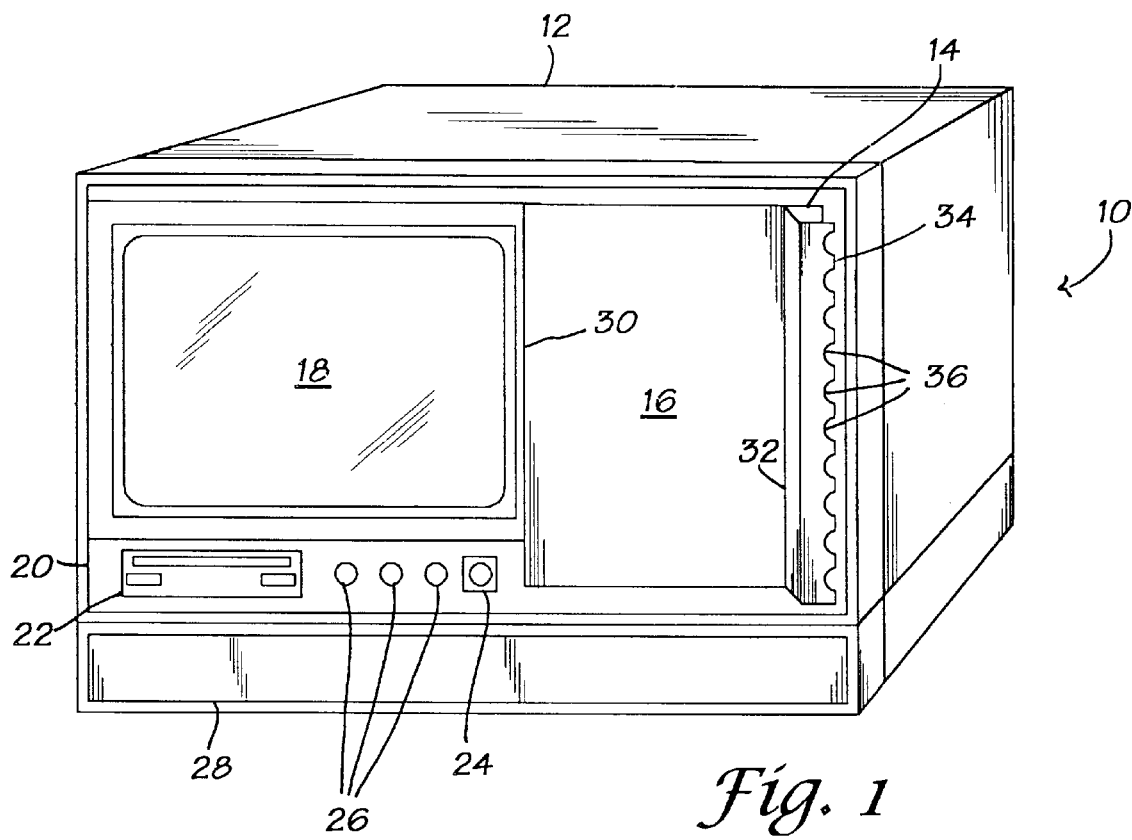
FIG. 1 is a perspective view of a compact multiplexed spectrophotometry apparatus according to a preferred embodiment of the present invention.

In the following description, reference numerals are used to identify structural elements, portions of elements, or surfaces in the drawings, as such elements, portions or surfaces may be further described or explained by the entire written specification. For consistency, whenever the same numeral is used in different drawings, it indicates the same element, portion, surface and area as when first used. As used herein, the terms "horizontal," "vertical," "left," "right," "up," "down," as well as adjectival and adverbial derivatives thereof, refer to the relative orientation of the illustrated structure as the particular drawing figure faces the reader.

Referring now to FIG. 1, there is shown a perspective view of a multiplexed spectrophotometry apparatus 10 according to a preferred embodiment of the present invention. Apparatus 10 includes a housing 12 with a front opening 14 and an access door 16, and contains a compact spectrophotometer, a multiplexer, a cooling fan, a flash lamp or other suitable light source, and associated control circuitry (to be described further below). A monitor with a screen 18 is located at the front of housing 12; a control panel 20 includes at least one disk drive 22, an on/off switch 24, and indicator lights 26. Disk drive 22 may be a floppy disk drive, DVD drive, CD-ROM drive, JAZ drive, ZIP drive, Bernoulli drive, or any other convenient device for receiving removable storage media. If desired, disk drive 22 may be replaced by (or supplemented by) a tape drive or PCMCIA slot.

A drawer or recess 28 holds a computer keyboard (not shown) which may be used for programming and/or operating apparatus 10. If desired, drawer 28 may also hold other user-operable input devices for operating and/or programming apparatus 10. The dimensions of housing 12 depend on the selection of components contained therein; however, housing 12 is preferably dimensioned and configured so that apparatus 10 may be used as a rack-mounted or bench-top instrument.

Door 14 is hingedly connected to the front of housing 12 at an edge 30, preferably closed by spring-loaded fasteners or some other suitable mechanism (not shown). An opposing edge 32 of door 14 carries an outwardly-projecting member 34 having a plurality of cutouts or throughholes 36. Member 34 provides strain relief when fiber optic cables that connect remote probes to instrumentation in the interior of housing 12 are placed in cutouts 36. By eliminating tangling and excessive bending of the cables, member 34 helps prolong the useful life of optical devices (probes, cables, and so forth) used with apparatus 10.

Figure 2:
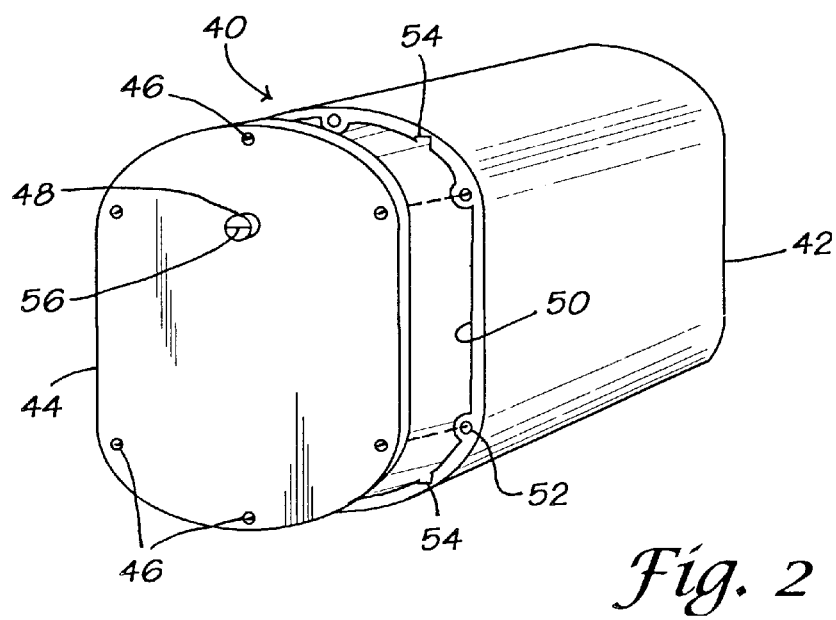
FIG. 2 is a partially-exploded, perspective view of a spectrophotometer housing according to a preferred embodiment of the present invention.

As noted above, housing 12 contains a compact spectrophotometer, preferably a spectrophotometer 40 according to the present invention (FIG. 2). Spectrophotometer 40 includes a housing 42 with end plates 44 (only one of plates 44 is shown) attached thereto by screws 46 or other suitable fasteners. Front panel 44 has a window 48 installed therein, of quartz, metal, or other suitable material. Window 48 has a slit 56.

Housing 42 is preferably machined of metal (aluminum, aluminum alloys, brass, stainless steel, etc.), and is shaped to promote the radiation of heat from the housing and the interior thereof. It is well known that, the larger the surface area of an object relative to its volume, the better that object radiates heat. Thus, housing 42 is preferably rounded or partial-cylindrical in shape (i.e., at least partially circular in cross-section). In a preferred embodiment of the invention, housing 42 is made of extruded aluminum.

An interior surface 50 of housing 42 may be shaped to accommodate various components of spectrophotometer 40. For example, screws 46 are screwed into threaded holes 52, and recesses such as recesses 54 may hold circuit boards (to be described below). If desired, housing 42 may have outwardly-projecting fins to further promote heat dissipation and reduce the cooling requirements for spectrophotometer 40.

Before installation in housing 12, spectrophotometer 40 is evacuated, filled with a dry gas (nitrogen, helium or other inert gas, etc.), and sealed. An inert atmosphere inside housing 42 minimizes UV absorption and helps prevent undesirable condensation on the cooled electronics and other interior components of spectrophotometer 40. The shape and materials of housing 42 (including end plates 44) help reduce undesirable changes in the temperature of spectrophotometer 40 during use, thereby helping prevent undesirable temperature-dependent wavelength shifts.

Figure 3A:
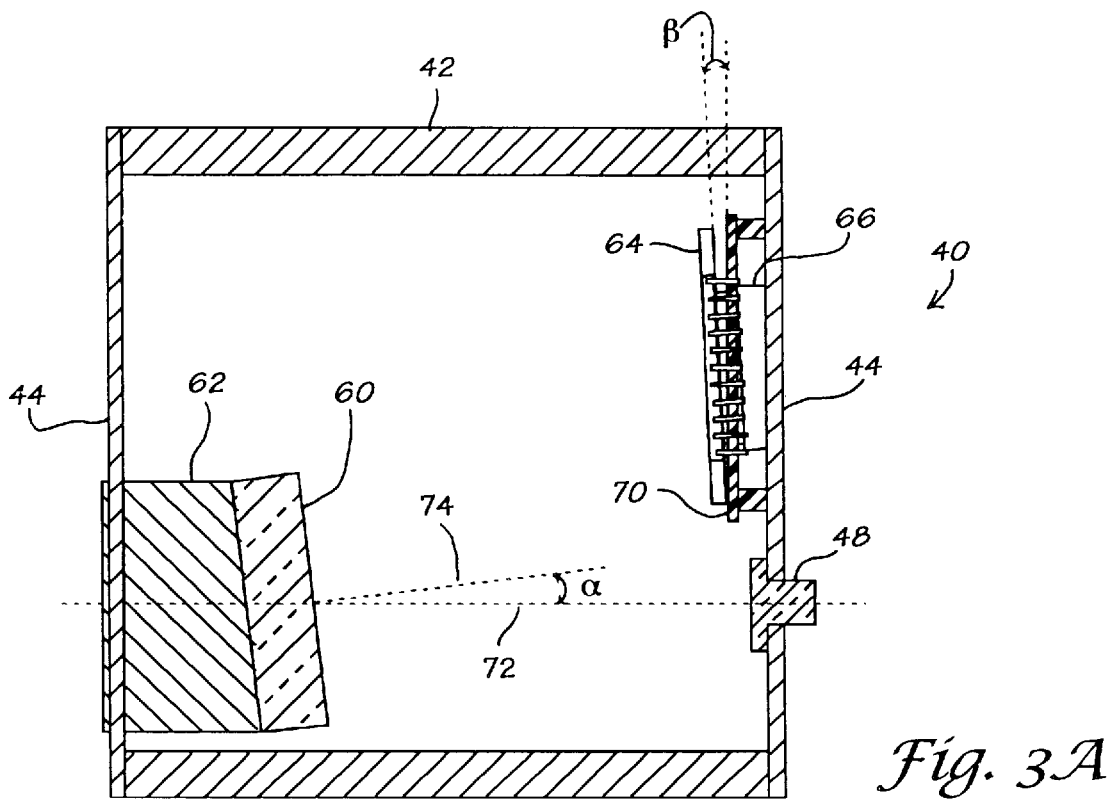
FIG. 3A is a vertical cross-sectional view of the interior of a spectrophotometer according to the present invention, taken in the plane of the window of FIG. 2.
Figure 3B:
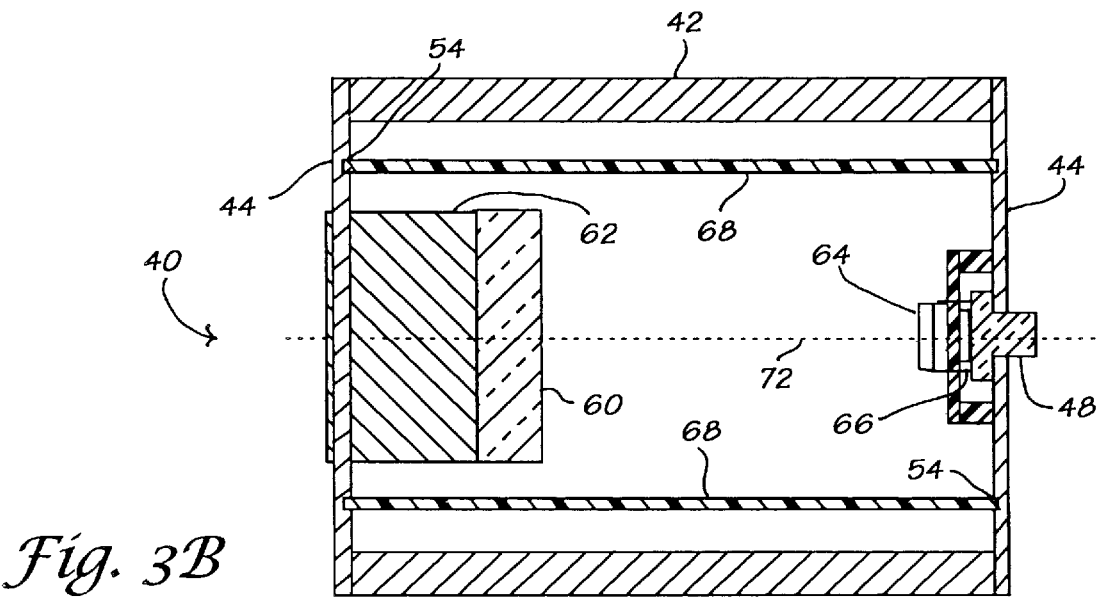
FIG. 3B is a horizontal cross-sectional view of the interior of a spectrophotometer according to the present invention, taken in the plane of the window of FIG. 2.

As best seen in FIGS. 3A and 3B, spectrophotometer 40 contains an optical element 60 (preferably a holographic grating) attached to a grating mount 62, a CCD detector 64, a thermoelectric cooler 66 in thermal communication with detector 64 and attached to a mount 70, and at least one circuit board 68. Preferably, the length of slit 56 of window 48 and the focal length of optical element 60 are unequal; most preferably, slit 56 is longer than the focal length of element 60. The unequal focal length between slit 56, optical element 60, and detector 64 maximizes the amount of light that is reflected by element 60 and focused onto the detector. In addition to containing the components of spectrophotometer 40, housing 42 (together with end plates 44) serves as both the mount and the heat sink for optical element 60, detector 64, and the electronics of spectrophotometer 40.

Window 48 with slit 56, element 60, and detector 64 are positioned and aligned so as to maximize the amount of light that reaches the detector (FIGS. 3A, 3B). Element 60 and detector 64 are offset from one another approximately as shown. In addition, when viewed from the top of housing 42 (FIG. 3A), element 60 is not quite parallel to window 48; detector 64 is not quite parallel to grating 60 and window 48. That is, an optic axis 72 of window 48 is disposed at an angle a with an optic axis 74 of element 60. However, when viewed from the side, as in FIG. 3B, axes 72, 74 coincide and element 60, detector 64, and window 48 are approximately parallel. In addition, elements 64, 70 are at an angle β with respect to each other.

Preferably, element 60 is a holographic grating having different front and rear focal lengths, with the front focal length being the longer of the two. Thus, detection is accomplished essentially completely within housing 42. As noted above, housing 42 serves as both the spectrophotometer housing and the detector housing: a second, detector housing is not needed.

The optimum dimensions and relative positions of window 48, slit 56, element 60 and detector 64, as well as the selection of angles α and β, depend on the dimensions of housing 42 and multiplexer 80 (to be described below), the desired performance characteristics of spectrophotometer 40, the distance between slit 56 and detector 64, and the properties of element 60 and detector 64. Thus, these parameters are best determined by a modest amount of computation and experimentation for each particular application.

Spectrophotometer 40 may contain all digital electronics, or a combination of analog and digital electronics. In the latter case, the analog electronics are installed on one circuit board 68, and the digital electronics on another circuit board 68. Separating analog and digital electronics in this way minimizes noise in the analog circuitry.

Figure 4A:
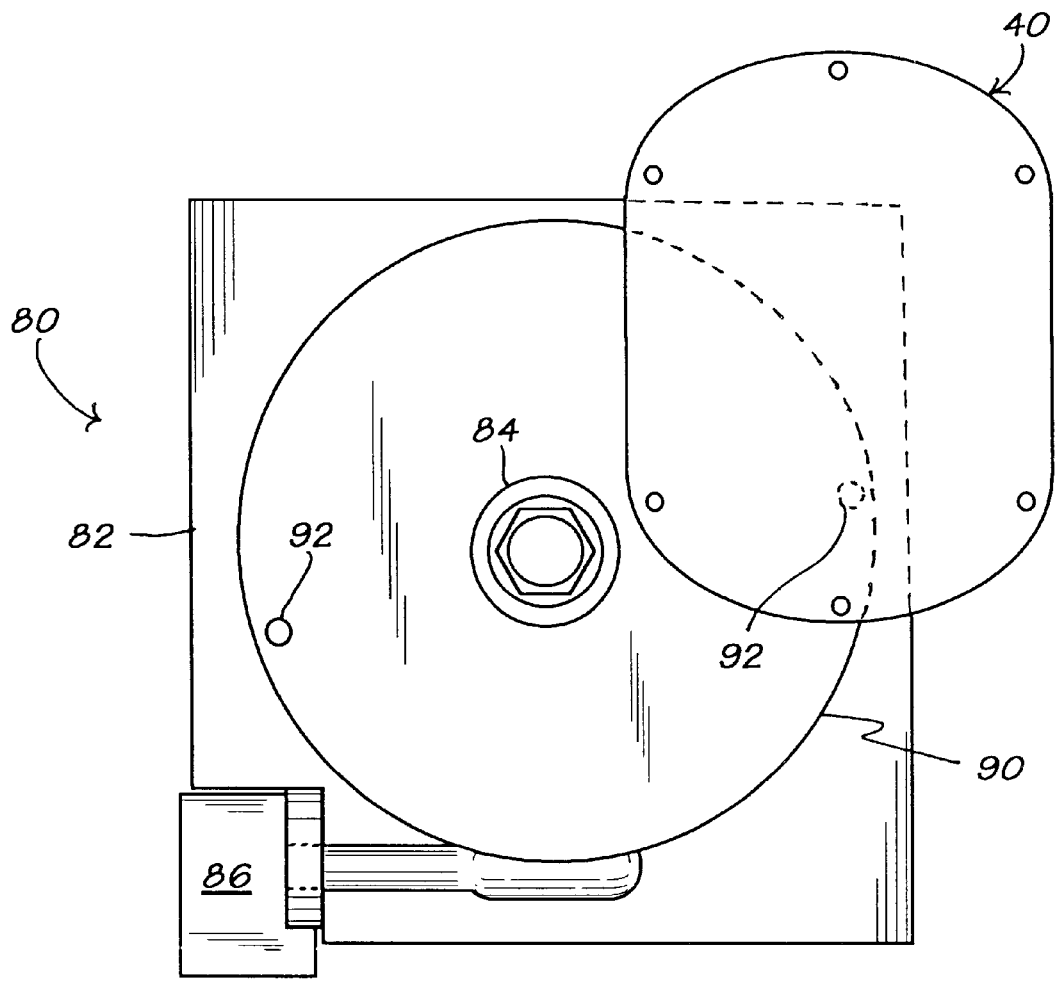
FIG. 4A shows the spectrophotometer of FIG. 2 attached to a rotary multiplexer.

Spectrophotometer 40 is mounted to a multiplexer, preferably the rotary multiplexer described in our co-pending, commonly-assigned application Ser. No. 08/943,165 (Rotary Fiber Optic Multiplexer), filed Oct. 3, 1997 (FIG. 4A). Such a multiplexer 80 includes a base plate or first stage 82 with a plurality of throughholes (not shown) arranged in a substantially circular array. The throughholes are fitted with fiber optic terminals or connectors. Plate 82 is connected to the other components of multiplexer 80 (to be described below) by a roller bearing assembly 84. A stepper motor, indicated schematically as 86, is positioned generally as shown.

Figure 4B:
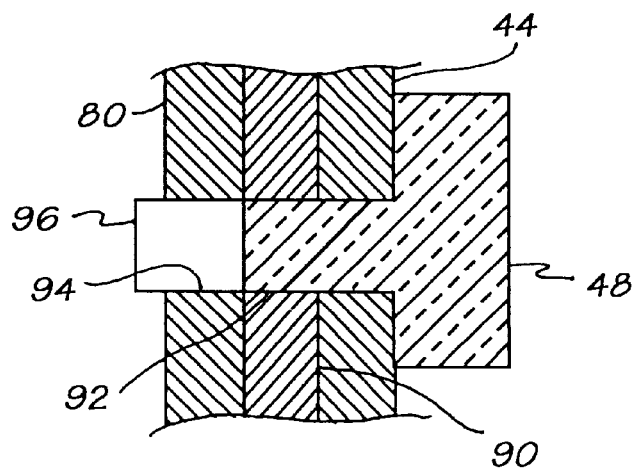
FIG. 4B is a detail cross-sectional view showing the spectrophotometer window juxtaposed with a throughhole in the rotary plate of the multiplexer.

A rotary plate or second stage 90 is positioned above base plate 82, connected thereto by roller bearing assembly 84, which is described in detail in application Ser. No. 08/943, 165, the disclosure of which is incorporated herein by reference. Rotary plate 90 has at least one throughhole 92, positioned so that hole 92 can be aligned with any of the throughholes of base plate 82 (FIG. 4B). Window 48 is inserted into throughhole 92 so that the window is approximately flush with rotary plate 90. By operating motor 86 to rotate plate 90, throughhole 92 (and window 48) can be aligned with any selected throughhole 94 in base plate 82, and thereby to any optical device (cable, probe, etc.), indicated schematically as 96 fitted to or connected to the throughhole. Window 48 can thereby be aligned accurately and reproducibly with a selected optical fiber (and probe). In addition, mounting spectrophotometer 40 directly to multiplexer 80 eliminates fiber-to-fiber coupling and associated reductions in signal amplitude, thereby improving optical throughput to 70% or higher.

Multiplexer 80 includes a fiber-to-fiber switching system than enhances the functionality of a spectrophotometer, allowing it to receive real-time data input from as many probes as are carried by the multiplexer. Multiplexer 80 has a rugged roller bearing arrangement that provides stable, accurate measurement of multiple optical channels with a repeatability of less than 5 microns, switching times less than 1 second per channel, and total optical throughput greater than 70%. With one throughhole 92 in rotary plate 90, multiplexer 80 can receive real-time data from as many probes as there are throughholes 94 in base plate 82; with two such throughholes 92, from half as many probes. Furthermore, multiplexer 80 has no internal optics, thus, it can readily be interfaced with existing fiber optic systems (including spectrophotometers, fibers, and probes) without constraints as to fiber size or type. A single multiplexer 80 can be interfaced to a plurality fiber sizes ranging from approximately 50 microns to over 1000 microns, a plurality of probe types, multiple light sources and/or process analyzers.

Multiplexer 80 is made of any rugged, durable materials, in any convenient dimensions for use with apparatus 10, with any desired number of throughholes for mounting fiber optic terminals (or other optical devices) for connecting to remotely-located optical probes. Base plate 82 and rotary plate 90 may be machined of stainless steel, aluminum, or brass (other metals such as Inconel™ alloys may be preferred for use in severe environments). As noted above, multiplexer plates 82, 90 act as supplemental heat sinks for spectrophotometer 40.

Figure 5:
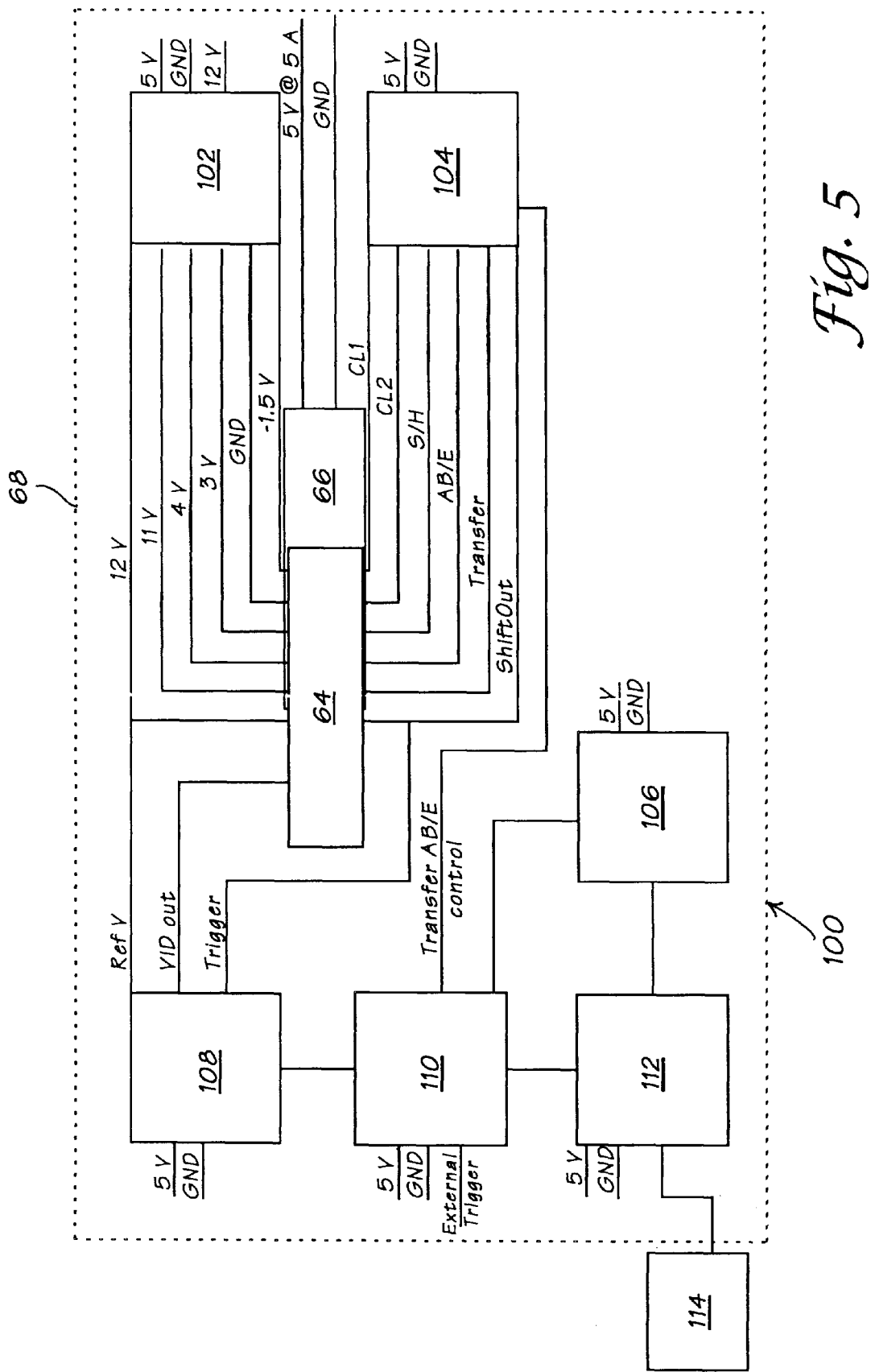
FIG. 5 is a schematic view of a circuit suitable for use with the invention.

The electronic circuitry of spectrophotometer 40 is mounted to a circuit board or boards 68, as shown schematically in FIG. 5. A circuit 100 suitable for use with the present invention includes CCD detector 64 in thermal communication with CCD cooler 66, DC bias circuits 102, clocking circuits 104, memory circuits 106, ADC circuits 108, microprocessor circuits 110, and computer interface circuits 112, connected generally as shown. Circuit 100 is connected to an on-board computer 114; no other circuitry is needed.

Apparatus 10 may include a light source such as a deuterium lamp, tungsten-halogen lamp, or xenon arc lamp. If desired, apparatus 10 may include a plurality of light sources, thereby allowing the user to select the most appropriate source for a measurement or series of measurements.

Spectrophotometer 40 makes use of readily available components to produce an instrument that covers a broad wavelength range from ultraviolet to near infrared (approximately 200 nm–800 nm), with a bandpass of approximately 0.7 nm and dynamic range greater than 15,000. Chemometric software facilitates full-function data acquisition and analysis, and an on-board computer permits essentially real-time monitoring. As noted above, the performance characteristics of spectrophotometer 40 depend on the selection of components. The selection of optical element 60, CCD detector 64, and the other components of spectrophotometer 40 may vary widely within the spirit of the present invention. By way of example, detector 64 may be a 16-bit, 2048 element thermoelectrically-cooled device capable of exposure times from approximately 0.02 seconds to more than 30 seconds. However, other types of CCD detector may also be useful for the practice of the invention.

In operation, DC bias circuits 102 supply the bias voltages needed to operate CCD sensor 64; clock circuits 104 provide square pulse trains 120, 122 that are 180° out of phase with each other; 124 and 126 control exposure (one pulse at the start of each transfer of charge from CCD 64 to the readout registers). Computer 114 controls the operation of spectrophotometer 40 and multiplexer 80 in a manner that will now be evident to those skilled in the art, processes spectrophotometric data, and stores the processed data to memory. Spectra can be recorded digitally, stored, analyzed with any convenient chemometric software, then displayed locally or output to a host system via Ethernet or RS232 communication ports. Data may also be stored on floppy disks or other removable media inserted into disk drive 22.

A spectrophotometry apparatus according to the present invention offers the user the advantage of enhanced functionality in a compact, streamlined, rugged system with an on-board computer. The apparatus provides a rugged, on-line process control system for applications such as chemical reaction monitoring and mineral level tracking in solution. Its multiplexing capability allows the user to move from batch-processing to continuous processing, allowing monitoring of an entire process with just one spectrophotometer. While other spectrophotometers and multiplexers may be used with the invention, spectrophotometer 40 provides a high resolution, high sensitivity instrument that covers a wide range (approximately 200 nm–800 nm). Multiplexer 80 provides stable, accurate positioning of multiple optical fibers with high reproducibility and fast switching times (typically less than 1 second/channel) and high optical throughput. Indeed, spectrophotometer 40 may be useful for other applications.

It will be apparent to those skilled in the art that many changes and substitutions can be made to the preferred embodiment herein described without departing from the spirit and scope of the present invention as defined by the appended claims.

What is claimed is:

1. An apparatus for use in spectrophotometry, comprising:
   a housing with an interior;
   a multiplexer having a movable stage and a stationary stage; and
   a spectrophotometer mounted to said movable stage of said multiplexer, said multiplexer and said spectrophotometer disposed in said interior.

2. The apparatus as recited in claim 1, further comprising a computer in operational connection with said spectrophotometer.

3. The apparatus as recited in claim 1, wherein said spectrophotometer further comprises a spectrophotometer housing, said spectrophotometer housing configured to promote the radiation of heat from said spectrophotometer.

4. The apparatus as recited in claim 1, wherein said housing further comprises means for relieving strain on cables extending from said interior to an exterior of said housing.

5. The apparatus as recited in claim 1, wherein said stationary stage of said multiplexer has a plurality of first throughholes arranged in a substantially circular array, said array having a radius,
   wherein said movable stage of said multiplexer has at least one second throughhole;
   wherein said spectrophotometer has an optical input, said spectrophotometer being positioned so that said optical input is in alignment with a second throughhole; and
   means for moving said movable stage with respect to said stationary stage to bring said at least one second throughhole into registration with a selected first throughhole whereby a first optical device secured to said selected first throughhole is in optical connection with said second throughhole so that said first optical device is optically connected to said optical input of said spectrophotometer.

6. The apparatus as recited in claim 5, wherein said moving means further comprises means for rotating said movable stage with respect to said stationary stage by a preselected angle.

7. The apparatus as recited in claim 5, wherein said movable stage and said stationary stage are made of metal.

8. The apparatus as recited in claim 1, further comprising at least one device mounted to said movable stage of said multiplexer, said device selected from the group consisting of optical cables, optical terminators, and optical probes.

9. The apparatus as recited in claim 1, further comprising at least one light source in said interior of said housing.

10. The apparatus as recited in claim 1, further comprising heat sink means in said housing, at least a portion of said heat sink means promoting radiation of heat from said apparatus during operation thereof.

11. The apparatus as recited in claim 1, wherein said spectrophotometer further comprises:
    a housing having an interior, said housing configured to promote the radiation of heat from said spectrophotometer;
    a window in said housing;
    an optical element in said interior, said optical element positioned to receive light transmitted through said window, said optical element being not quite parallel to said window;
    a detector in said interior, said detector positioned to receive light reflected from said optical element, said detector not quite parallel to said window; and
    means for converting reflected light received by said detector to an electrical signal, said converting means processing said electrical signal and transferring said electrical signal to a computer.

12. An apparatus for use in spectrophotometry, comprising:
    a housing with an interior;
    a multiplexer having
      a movable stage with a first axis and a plurality of first throughholes arranged about said first axis in a substantially circular array, said array having a radius,
      a stationary stage having a second axis and at least one second throughhole, said second throughhole spaced apart from said second axis by a distance approximately equal to said radius, and
      means for rotatably connecting said movable stage and said stationery stage so that said first axis and said second axis coincide, so that, when one of said stages is rotated about said second axis, said second throughhole can be brought into registry with a selected first throughhole; and
    a spectrophotometer mounted to said movable stage of said multiplexer, said spectrophotometer having
      an optical input aligned with said second throughhole, and
      a spectrophotometer housing configured to promote the radiation of heat from said spectrophotometer, wherein said multiplexer and said spectrophotometer are disposed in said interior, an optical device secured to selected first throughhole being optically connected to said optical input when said selected first throughhole is in registry with said second throughhole.

13. The apparatus as recited in claim 12, further comprising a programmable computer in operational connection with said spectrophotometer.

14. The apparatus as recited in claim 12, wherein said housing further comprises means for relieving strain on cables extending from said interior to an exterior of said housing.

15. The apparatus as recited in claim 12, wherein said movable stage and said stationary stage are approximately planar.

16. The multiplexer as recited in claim 12, wherein said connecting means further comprises:
    a rotatable coupler assembly connecting said movable stage and said stationery stage;
    a stepper motor; and
    a worm screw assembly operatively connected to said movable stage, said stepper motor operating said worm screw assembly to rotate said movable stage with respect to said stationary stage by a user-selectable angle.

17. The apparatus as recited in claim 12, wherein said housing, said spectrophotometer housing, said movable stage and said stationary stage are made of metal.

18. The apparatus as recited in claim 12, further comprising:

at least one device mounted to said movable stage of said multiplexer, said device selected from the group consisting of optical cables, optical terminators, and optical probes; and at least one device mounted to said stationary stage of said multiplexer, said device selected from the group consisting of optical cables, optical terminators, and optical probes.

19. The apparatus as recited in claim 12, further comprising at least one light source in said interior of said housing.

20. The apparatus as recited in claim 12, further comprising heat sink means in said housing, at least a portion of said heat sink means promoting radiation of heat from said apparatus during operation thereof.

* * * * *